(12) United States Patent
Liu et al.

(10) Patent No.: US 8,896,186 B2
(45) Date of Patent: Nov. 25, 2014

(54) APPARATUS FOR PROVIDING HAPTIC FEEDBACK

(75) Inventors: Lin Liu, Shenzhen (CN); Jie He, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 294 days.

(21) Appl. No.: 13/527,821

(22) Filed: Jun. 20, 2012

(65) Prior Publication Data

US 2012/0326568 A1 Dec. 27, 2012

(30) Foreign Application Priority Data

Jun. 27, 2011 (CN) .................. 2011 2 0220161 U

(51) Int. Cl.
*H01L 41/053* (2006.01)
*G06F 3/01* (2006.01)

(52) U.S. Cl.
CPC ..................................... *G06F 3/016* (2013.01)
USPC ............ 310/348; 310/339; 310/338; 310/331

(58) Field of Classification Search
CPC .......... H01I 41/053; H01I 41/23; H01I 41/29; G06F 3/016
USPC ......... 310/348, 326, 311, 339, 321, 328, 338; 345/173, 156

See application file for complete search history.

(56) References Cited

U.S. PATENT DOCUMENTS

| | | | |
|---|---|---|---|
| 5,765,046 A * | 6/1998 | Watanabe et al. ............. | 310/348 |
| 6,405,158 B1 | 6/2002 | Massie et al. | |
| 6,429,846 B2 | 8/2002 | Rosenberg et al. | |
| 6,853,965 B2 | 2/2005 | Massie et al. | |
| 7,148,875 B2 | 12/2006 | Rosenberg et al. | |
| 7,535,454 B2 | 5/2009 | Jasso et al. | |
| 7,872,397 B2 * | 1/2011 | Clingman et al. ............. | 310/328 |
| 2008/0122315 A1 * | 5/2008 | Maruyama et al. ........... | 310/332 |
| 2012/0298935 A1 * | 11/2012 | Ross .............................. | 254/2 R |
| 2012/0326568 A1 * | 12/2012 | Liu et al. ....................... | 310/348 |

* cited by examiner

*Primary Examiner* — Thomas Dougherty
*Assistant Examiner* — Karen B Addison
(74) *Attorney, Agent, or Firm* — Anova Law Group, PLLC

(57) ABSTRACT

Disclosed is an apparatus used in an electronic device for providing haptic feedback. The apparatus includes a holder having a pair fastening holes, a piezoelectric vibrator having a first though holes, a terminal with a second though hole mounted on the piezoelectric vibrator and electrically connected to the piezoelectric vibrator, and a pair of fixing portions fixing the terminal and the piezoelectric vibrator on the holder though the second though hole of the terminal, a first though holes of the piezoelectric vibrator and the fastening holes of the holder. The fixing portions fix the terminal and piezoelectric vibrator on the holder, which makes the assembling process much easier.

9 Claims, 3 Drawing Sheets

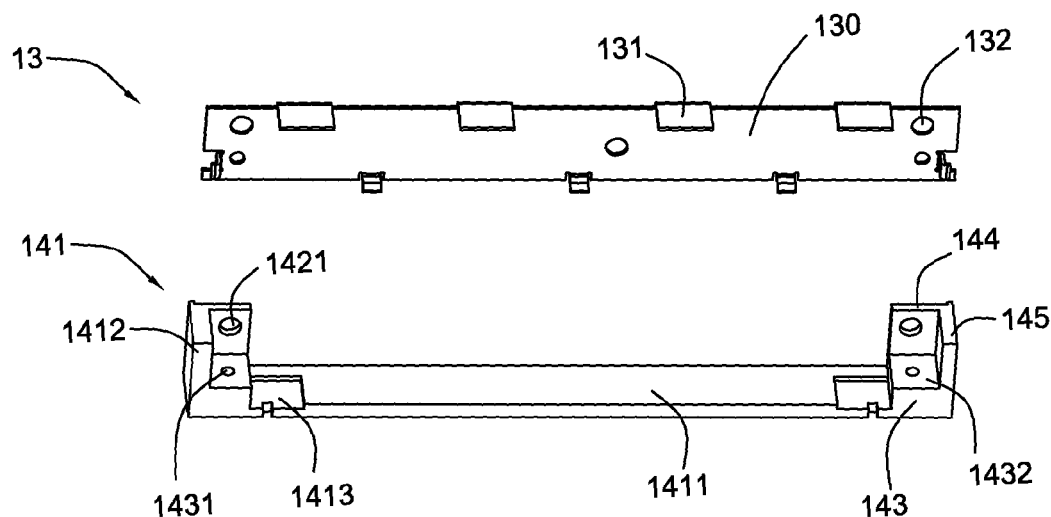
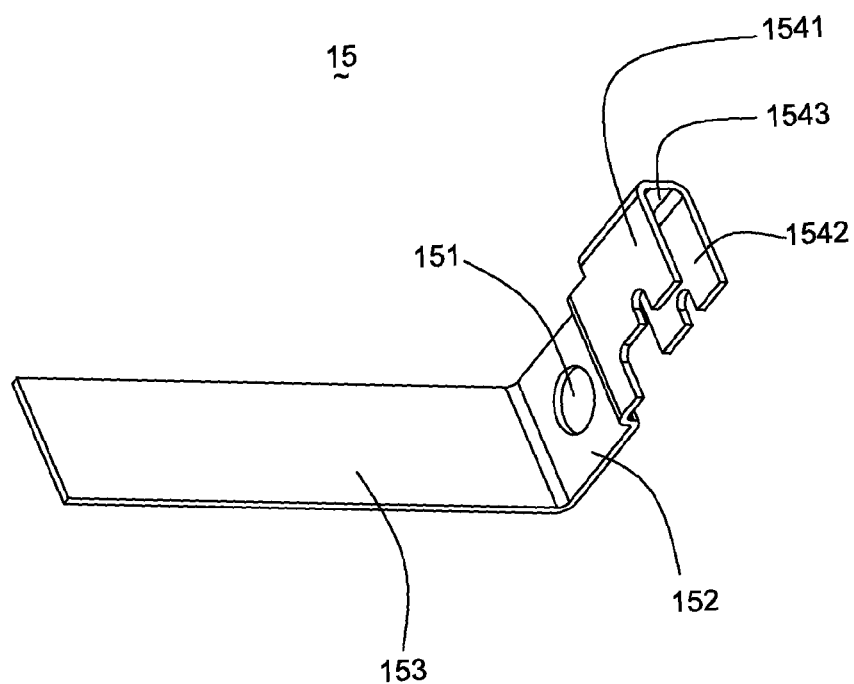
Fig. 3
Fig. 4

APPARATUS FOR PROVIDING HAPTIC FEEDBACK

FIELD OF THE INVENTION

The present invention generally relates to apparatuses for providing haptic feedbacks.

DESCRIPTION OF RELATED ART

As disclosed in U.S. Pat. No. 7,535,454 B2, portable electronic devices, such as mobile phones, portable GPS navigations, laptop computers, generally have a number of buttons that allow a user to interface with the devices by inputting information. The capabilities of these devices are increasing while the size and weight are decreasing to enhance portability. For example, mobile phones, in addition to their traditional role as voice-communication devices, now include functions traditionally associated with other devices, such as electronic games, PDAs, and digital cameras.

To perform effective interaction with the handheld devices, the handheld devices typically provide visual and aural cues or feedback. In addition to conventional visual and aural feedback, some of these devices attempt to enhance the effectiveness of device feedback by providing tactile cues or feedback. Some devices utilize structural tactile methods. One such example is to provide raised surfaces on the input surface, e.g., a keypad, of the device. Such methods, however, are inherently static and thus cannot offer effective tactile feedback.

Active methods of providing tactile feedback include incorporating a vibrator into the handheld electronic devices. Such a method of providing haptic cues, however, generally vibrates the entire device. Such method or apparatuses are disclosed in U.S. Pat. No. 7,535,454 B2, U.S. Pat. No. 7,148,875 B2, U.S. Pat. No. 6,853,965 B2, U.S. Pat. No. 6,429,846 B2, U.S. Pat. No. 6,405,158 B2.

BRIEF DESCRIPTION OF THE DRAWINGS

FIG. 3 is an illustrative isometric view of a holder of the apparatus in FIG. 1.

FIG. 4 is an illustrative isometric view of a terminal of the apparatus in FIG. 1.

DETAILED DESCRIPTION OF THE EXEMPLARY EMBODIMENT

Reference will now be made to describe the exemplary embodiment of the present invention in detail. The present invention is presented for providing the user with intensive interaction experience. For example, if a user taps on a touch screen of a portable gaming, the user will get a tactile feedback, such as vibration, from the touch screen.

Figure 1:
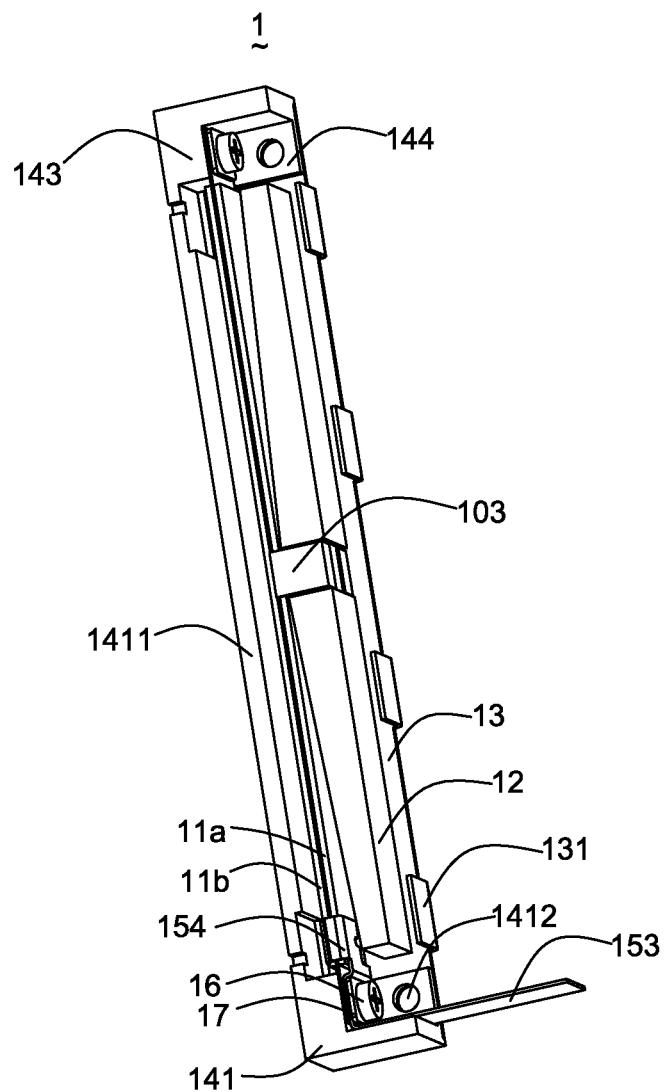
FIG. 1 is an illustrative assembled view of an apparatus for providing haptic feedback in accordance with an exemplary embodiment of the present invention.

Referring to FIG. 1, an apparatus 1 for providing haptic feedback, in accordance with an exemplary embodiment of the present invention includes a holder 14, a piezoelectric vibrator mounted on the holder 14, a terminal 15 fixed on the holder 14 and electrically connected to the piezoelectric vibrator, and a pair of fixing portions 16 for fixing the piezoelectric vibrator and the terminal 15 on the holder 14, respectively.

Figure 2:
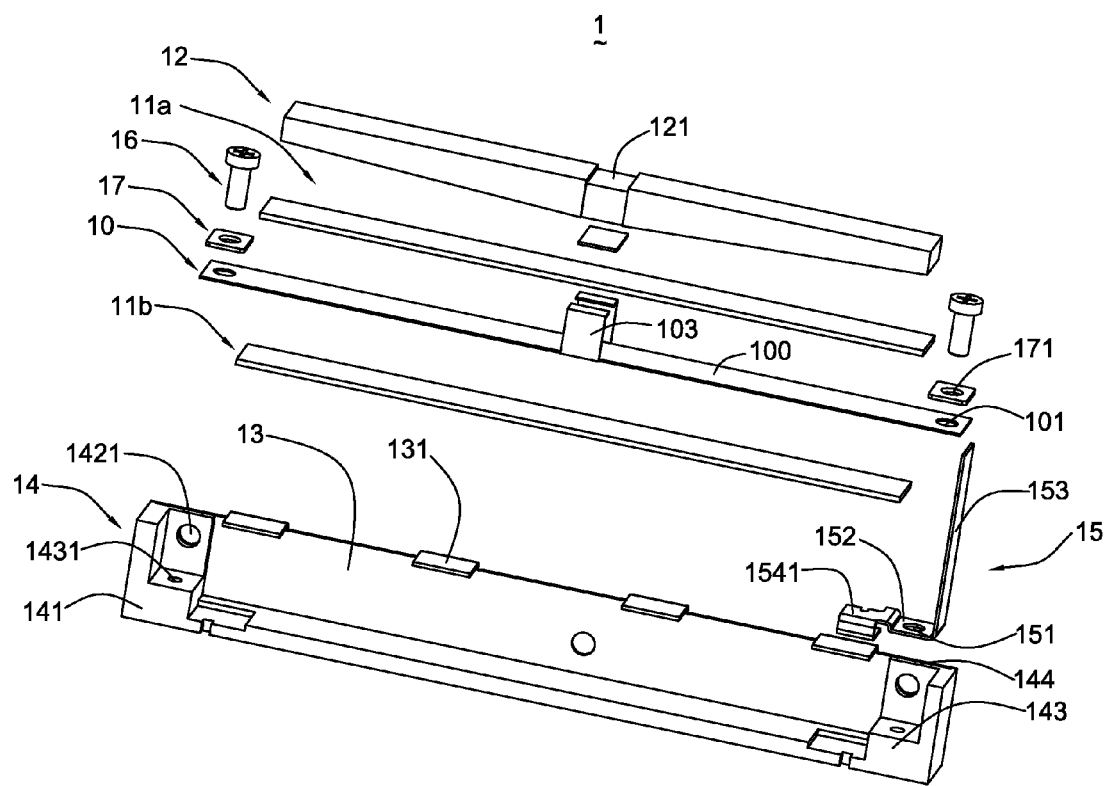
FIG. 2 is an exploded view of the apparatus in FIG. 1.

Referring to FIGS. 2 and 3, along with FIG. 1, the holder 14 comprises a plastic base 141 and a metal plate 13 assembled with the plastic base 141 by injection molding for improving the mechanical strength of the apparatus 1. The plastic base 141 comprises a bottom portion 1411 and a pair of mounting portions 1412 connected with two ends of the bottom portion 1411. The bottom portion 1411 has at least a receiving concave 1413 for receiving the terminal 15 when the piezoelectric vibrator vibrates toward the bottom portion 1411. Each of mounting portions 1412 comprises a step portion 143 for supporting the piezoelectric vibrator, a first sidewall 144 extending from the step portion 143 and perpendicular to the step portion 143, and a second sidewall 145 extending from the step portion 143 and perpendicular to the step portion 143 and the first sidewall 144, respectively. The first and second sidewalls 144, 145 are connected with each other. The step portions 143 have a pair of mounting surfaces 1432 parallel to the bottom portion 1411 for engaging with the piezoelectric vibrator and a pair of fastening holes 1431 formed in the mounting surfaces 1432. Screw threads are provided on inner sides of the fastening holes 1431. The first sidewall 144 has a first fixing hole 1421.

The metal plate 13 is assembled with the bottom portion 1411 and the first sidewalls 144 of the mounting portions 1412 by injection molding, thereby forming an integral unit. The metal plate 13 comprises a main plate 130 and a plurality of stops 131 extending perpendicular from the main plate 130. A pair of second fixing holes 132 is formed on two ends of the main plate 130 and cooperated with the first fixing holes 1421 for fixing the apparatus on an electronic device, such as a mobile phone, a portable gaming device, etc.

The piezoelectric vibrator comprises a substrate 10, a first piezoelectric layer 11a attached to a side of the substrate 10, a second piezoelectric layer 11b attached to another side of the substrate 10, and a mass 12 attached to one of the piezoelectric layers 11a, 11b. Each of the substrate 10, the piezoelectric layers 11a, 11b, and the mass 12 is substantially perpendicular to the metal plate 13. Two piezoelectric layers 11a, 11b are used to enhance the vibration of the piezoelectric vibrator. In fact, only one piezoelectric layer can also vibrate. The substrate 10 further comprises a main body 100, a pair of fastening portion extending from two ends thereof and a pair of first through holes 101 provided on the fastening portions, respectively. Moreover, the stops 131 of terminal 15 are parallel to the fastening portions of the piezoelectric vibrator for limiting the vibrating amplitude of the piezoelectric vibrator. For firmly positioning the mass 12, the substrate 10 further comprises a pair of wings 103 extending perpendicularly from the main body 100, and accordingly, the mass 12 comprises a pair of notches 121. While assembled, the wings 103 are accommodated in the notches 121.

In the exemplary embodiment, the fixing portions 16 may comprise screws. In an alternative embodiment, the fixing portions may comprise rivets.

Referring to FIG. 4, the terminal 15 comprises a fixing plate 152, a U-shaped plate 154 extending from one end of the fixing plate 152, and an engaging plate 153 extending perpendicular from another end of the fixing plate 152 for engaging with the second sidewall 145 of the holder 14. The fixing plate 152 has a second through hole 151. The U-shaped plate 154 comprises a first plate 1541 connected with the fixing plate 152 for engaging with the first piezoelectric layer 11a, a second plate 1542 parallel to the first plate 1541 for engaging with the second piezoelectric layer 11b, and a connecting plate 1543 connecting the first and second plate 1541, 1542. A slot is formed by the first and second plates 1541, 1542 and the connecting plate 1543, for receiving the substrate 10 and the piezoelectric layers 11a, 11b of the piezoelectric vibrator therein.

In order to protect the terminal 15 from scratch by the fixing portions 16, the apparatus further comprises a pair of spacers 17 sandwiched between the fixing portions 16 and the terminal 15. Each spacer 17 has a third through hole 171.

When assembled, the terminal 15 is clamped with the piezoelectric vibrator by U-shaped plate 154 and the piezoelectric vibrator, the terminal 15 and the spacers 17 are mounted on the holder 14 by the screws 16 through the third though holes 171 of the spacers 17, the second though hole 151 of the terminal 15, the first though holes 101 of the substrate 10, and the fastening holes 1431 of the step portions 143 of the holder 14.

The fixing portions fix the terminal and piezoelectric vibrator on the holder, which makes the assembling process much easier. As the U-shaped plate is clamped with the piezoelectric vibrator, a combination of the piezoelectric vibrator and the terminal is stable and reliable. Furthermore, the metal plate is assembled the plastic base, a total size of the apparatus is reduced.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An apparatus for proving haptic feedback, comprising:
   a holder having a pair of mounting portions, each of the mounting portions comprising at least a fastening hole;
   a piezoelectric vibrator having a substrate, a first piezoelectric layer attached to a side of the substrate for being elastically supported by the substrate, the substrate having a main body and a pair of fastening portions extending from two ends of the main body and mounted on the mounting portions of the holder, each of fastening portion comprising at least a first though hole;
   a terminal with a fixing plate mounted on one fastening portion and electrically connected to the piezoelectric vibrator, the fixing plate comprising a second though hole; and
   a pair of fixing portions fixing the terminal and the piezoelectric vibrator on the mounting portion though the second though hole of the fixing plate, a first though holes of fastening portions and the fastening holes of the mounting portions.

2. The apparatus for providing haptic feedback as described in claim 1, wherein the holder comprises a plastic base and a metal plate assembled with the plastic base by injection molding for improving the mechanical strength of the apparatus, the mounting portions is formed on the plastic base.

3. The apparatus for providing haptic feedback as described in claim 2, wherein the metal plate comprises a main plate and a plurality of stops extending perpendicular from the main plate and parallel to the fastening portion of the piezoelectric vibrator for limiting the vibrating amplitude of the piezoelectric vibrator.

4. The apparatus for providing haptic feedback as described in claim 2, wherein each mounting portion comprises a step portion for supporting the piezoelectric vibrator.

5. The apparatus for providing haptic feedback as described in claim 4, wherein each mounting portion further comprise a first sidewall extending from the step portion and perpendicular to the step portion, and a second sidewall extending from the step portion and respectively perpendicular to the step portion and the first side wall, and the terminal further comprises an engaging plate extending perpendicular from another end of the fixing plate for firmly engaging with the holder.

6. The apparatus for providing haptic feedback as described in claim 1, wherein the fixing portions comprise screws.

7. The apparatus for providing haptic feedback as described in claim 1, wherein the fixing portions comprise rivets.

8. The apparatus for providing haptic feedback as described in claim 1 further comprising a pair of spacers each having a third though hole and sandwiched between the fixing portions and the terminal for protecting the terminal from scratch by the fixing portions.

9. The apparatus for providing haptic feedback as described in claim 8, wherein the terminal further comprises a U-shaped plate extending from one end of the fixing plate for clamping with the piezoelectric vibrator.

* * * * *